United States Patent
Wang et al.

(10) Patent No.: US 9,843,739 B2
(45) Date of Patent: Dec. 12, 2017

(54) METHOD FOR CORRECTING FLICKERS IN A SINGLE-SHOT MULTIPLE-EXPOSURE IMAGE AND ASSOCIATED APPARATUS

(71) Applicant: MediaTek Singapore Pte. Ltd., Singapore (SG)

(72) Inventors: Muge Wang, San Jose, CA (US); Chien-Chia Chien, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 14 days.

(21) Appl. No.: 14/877,468

(22) Filed: Oct. 7, 2015

(65) Prior Publication Data

US 2017/0104913 A1    Apr. 13, 2017

(51) Int. Cl.
*H04N 5/235* (2006.01)
*H04N 5/265* (2006.01)

(52) U.S. Cl.
CPC ......... *H04N 5/2357* (2013.01); *H04N 5/2353* (2013.01); *H04N 5/265* (2013.01)

(58) Field of Classification Search
None
See application file for complete search history.

(56) References Cited

U.S. PATENT DOCUMENTS

| | | | | |
|---|---|---|---|---|
| 2007/0273785 A1* | 11/2007 | Ogawa | ............... | H04N 5/2353 348/362 |
| 2014/0375848 A1* | 12/2014 | Yamamoto | ......... | H04N 5/2355 348/241 |

* cited by examiner

*Primary Examiner* — Mark T Monk
(74) *Attorney, Agent, or Firm* — McClure, Qualey & Rodack, LLP

(57) ABSTRACT

A method for correcting flickers in a single-shot multiple-exposure image and associated apparatus is provided. The single-shot multi-exposure image includes first image data and second image data. The method includes the steps of: computing a first vertical profile for the first image data and a second vertical profile for the second image data; computing a flicker modulation function according to the first vertical profile and the second vertical profile; and multiplying each pixel in the second image data by the flicker modulation function to correct flickers.

19 Claims, 4 Drawing Sheets

METHOD FOR CORRECTING FLICKERS IN A SINGLE-SHOT MULTIPLE-EXPOSURE IMAGE AND ASSOCIATED APPARATUS

BACKGROUND OF THE INVENTION

Field of the Invention

The invention relates to image processing, and, in particular, to an image-capturing apparatus and an associated method for correcting flickers in single-shot multiple-exposure images.

Description of the Related Art

Fluorescent lighting can cause objectionable flicker in video images, resulting in degradation of the quality of the video images. Specifically, flicker occurs when a camera images an object under illumination of a flickering light source such as a fluorescent lamp. Fluorescent lighting has the property of responding very quickly to instantaneous changes in AC power line voltage. Thus, fluorescent light sources literally turn on and off on each half cycle of the AC power supply, resulting in periodic variation of the brightness of the fluorescent light source over time. The periodic brightness variation of a fluorescent light source is referred to as "fluorescent flicker".

FIG. 1 is a diagram illustrating the light intensity of a fluorescent light source plotted over time. Fluorescent lighting acts as a rectifier of an AC power supply and the brightness or intensity of the light varies periodically at twice the frequency of the AC power supply. As shown in FIG. 1, when the AC power supply is assumed to be 50 Hz, a fluorescent light will turn on and off 100 times per second, resulting in a flicker frequency of 100 Hz. For a 60 Hz AC power supply, the flicker frequency of the fluorescent light will be 120 Hz. Although fluorescent flicker at 100 Hz or 120 Hz are not noticeable to the human eye, such flickering presents various problems for video or still image cameras.

However, if the video camera refresh rate has a frequency substantially different than the frequency of the AC power supply, then the flicker frequency of the fluorescent light does not have an integer multiple relationship with the refresh rate. Each captured field will end up sampling different portions of the periodic light variation cycles and therefore a different amount of light. This is illustrated in FIG. 1 where the flicker frequency is at 100 Hz while the refresh rate is at 60 Hz. As shown in FIG. 1, at each sampling field S1, S2, and S3, different amount of light is being sampled. When each image field samples different amount a light, the brightness of the resulting images will change from one field to another, resulting in observable and highly objectionable flickering in the video images.

In addition, line by line sampling is done one after another sequentially in an exposure image captured by an image sensor, and there is no clear time gap between line sampling. The flicker, i.e., horizontal banding, can be caused by the fact that each line of the exposure image is sampled at a slightly different time and that time span from the first line to the last line lasted more than one cycle of the AC power supply frequency which is not an integer multiple of the flicker frequency of the fluorescent light.

BRIEF SUMMARY OF THE INVENTION

A detailed description is given in the following embodiments with reference to the accompanying drawings.

A method for correcting flickers in a single-shot multiple-exposure image is provided. The single-shot multiple-exposure image includes first image data and second image data. The method includes the steps of: computing a first vertical profile for the first image data and a second vertical profile for the second image data; computing a flicker modulation function according to the first vertical profile and the second vertical profile; and multiplying each pixel in the second image data by the flicker modulation function to correct flickers.

An image-capturing apparatus is provided. The image-capturing apparatus comprises: a lens; an image sensor, and a controller. The image sensor is configured to capture a single-shot multiple-exposure image through the lens. The controller is configured to compute a first vertical profile for the first image data and a second vertical profile for the second image data, and computes a flicker modulation function according to the first vertical profile and the second vertical profile. The controller further multiplies the flicker modulation function to each pixel in the second image data to correct flickers.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
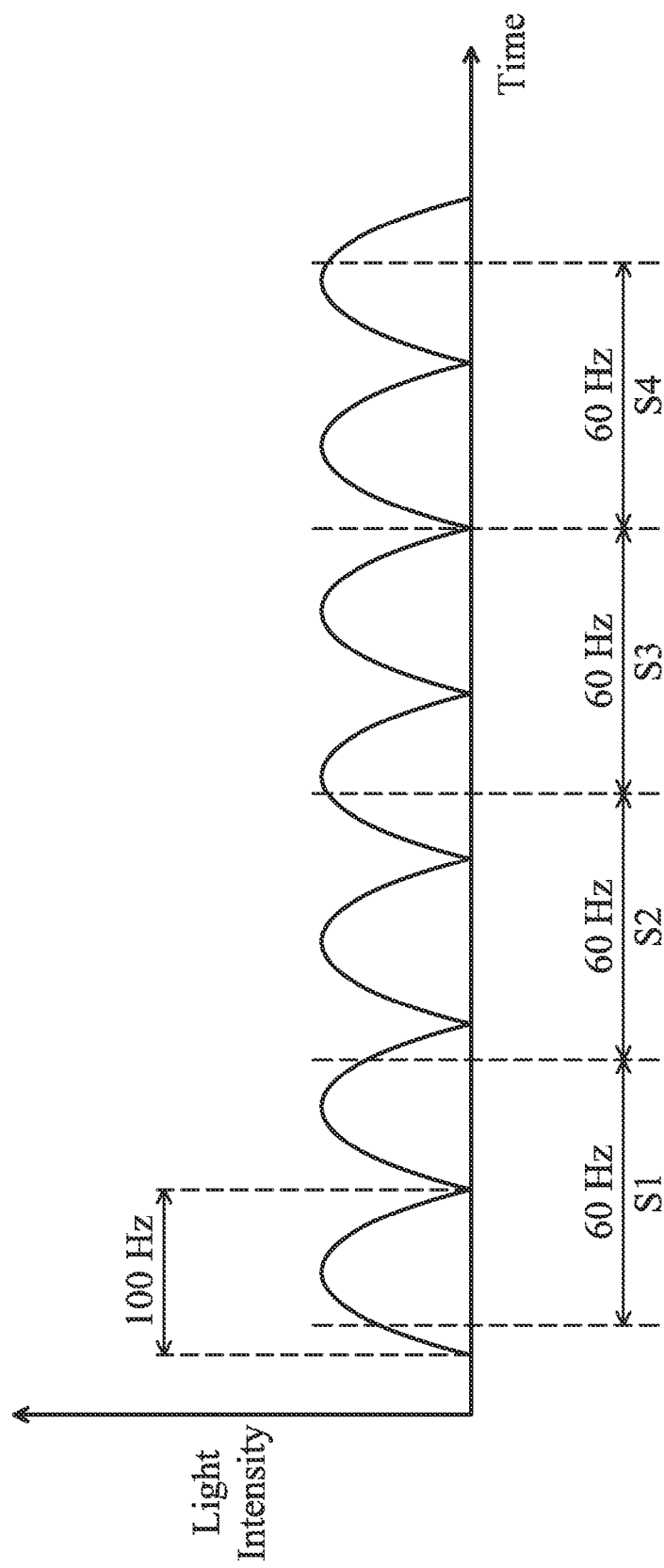
FIG. 1 is a diagram illustrating the light intensity of a fluorescent light source plotted over time.

In the present description, the term "fluorescent flicker" is used to refer to the flicker of an artificial light source powered by an AC power supply. Flickering of an AC powered artificial light source refers to the periodic brightness variations of the light source due to the cycling of the AC power supply. As described above with reference to FIG. 1, an artificial light source will have a flicker frequency twice the frequency of the AC power main used to power the light source. While such flickering occurs in both incandescent lighting and fluorescent lighting, the flicker of a fluorescent light source is especially problematic for video image capture. The flicker of an incandescent light source is so minimal that it is practically imperceptible and thus generally does not present a problem in video imaging. However, the flicker of a fluorescent light source can be problematic for video imaging particularly when the video imaging system uses a field rate that does not match the AC power supply of the fluorescent light source. In the present description, the flicker of an artificial light source is referred to as "fluorescent flicker" but the use of the term "fluorescent flicker" is not intended to limit the application of the invention to the flicker generated by AC powered fluorescent light sources only. One of ordinary skill in the art, upon being apprised of the invention, would appreciate that the method for correcting flickers in a single-shot multiple-exposure image of the invention can be applied to correcting flickering in images illuminated by any AC powered artificial light source.

Figure 2:
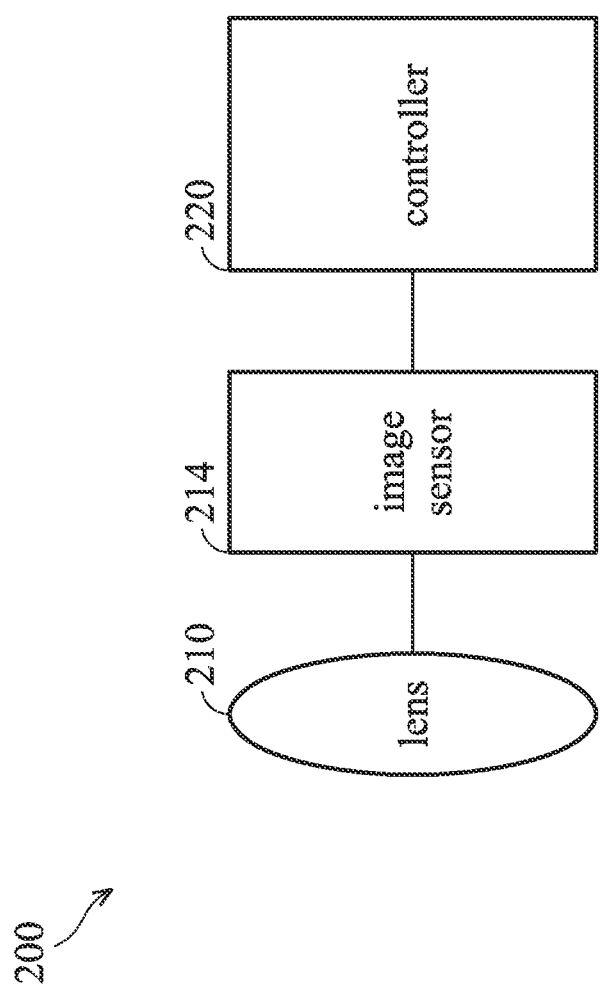
FIG. 2 is a block diagram of an image processing system in accordance with an embodiment of the invention.

FIG. 2 is a block diagram of an image-capturing apparatus in accordance with an embodiment of the invention. The image-capturing apparatus 200 comprises a lens 210, an image sensor 214, and a controller 220. The image-capturing apparatus 200 is configured to perform multiple-exposure shooting and single shooting. The multiple-exposure shooting is a technique designed to obtain multiple images of an object by shooting at shorter exposure time and a longer exposure time (or an optical exposure time) and to obtain a composite object image by combining the multiple object images. Here, an object image may be any one of a photoelectrically converted image and a shot image.

The lens 210 is configured to project light from an object onto the image sensor 214. The image sensor 214 includes an image capturing component such as a charge-coupled device (CCD), a complementary metal-oxide semiconductor (CMOS), or the like, and is configured to be exposed through the lens 210 to perform photoelectric conversion, to accumulate electric charges, to read the accumulated electric charges, and thereby to generate the photoelectrically converted image. In addition, the image sensor 214 is further capable of performing multiple-exposure shooting of an object image, such as performing long exposure and short exposure of the object image. Specifically, the image sensor 214 can be regarded as an interlaced sensor, in which the odd lines have one exposure (e.g. long exposure), and the even lines have another exposure (e.g. short exposure). The raw data of the object image are processed into two paths such as a long exposure path and a short exposure path, and the ratio of exposure time between the long exposure path and the short exposure path is typically between from 2× to 8×. For example, the odd lines are sequentially sampled by the image sensor 214 with a first exposure time, and the even lines are sequentially sampled by the image sensor 214 with a second exposure time.

Specifically, if the exposure time is not an integer multiple of the fluorescent flicker cycles, horizontal banding will appear in the resulting image. If an integer multiple of fluorescent flicker cycles is used, the horizontal banding will disappear in the resulting image. However, there is a lower limit of the exposure time to cancel the fluorescent flicker (e.g. 8.33 ms for 120 Hz or 10 ms for 100 Hz). The fluorescent flicker will appear in the short exposure path if the exposure time of the short exposure path is shorter than the lower limit (e.g. 8.33 ms for 120 Hz or 10 ms for 100 Hz), although the fluorescent flickers are cancelled in the long exposure path.

It should be noted that a fluorescent flicker is a one-dimensional (vertical) modulation signal multiplied to the image signals. That is, all the pixels in the same row should have the same modulation value. Assuming that the long exposure path is flicker-free, the exposure result between the adjacent long exposure path and the short exposure path should only differ in the exposure ratio for an ideal flicker-free image signal. However, the image contents between the long exposure path and the short exposure path are highly correlated. If the long exposure path is flicker free and the short exposure path has flicker, the exposure ratio and the flicker modulation function differs between the long exposure path and the short exposure path.

In an embodiment, the one-dimensional modulation signal can be estimated from the data field of the short exposure path and the corresponding long exposure path for non-clipped pixels (i.e. the intensity of the pixel is not saturated (intensity <255 for 8-bit pixel)). Subsequently, the inverse of the estimated one-dimensional modulation signal can be multiplied back to the image signal in the short exposure path to obtain a flicker-corrected signal even when the pixels are clipped in some locations in the exposure image of the long exposure path.

Figure 3:
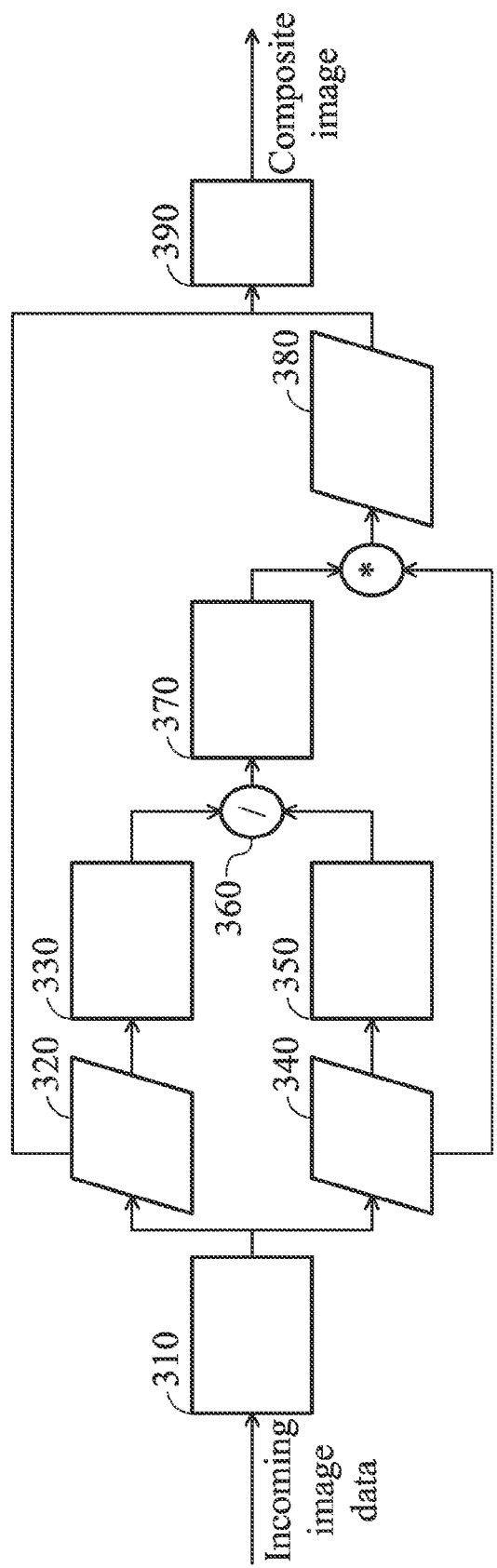
FIG. 3 is a diagram of correcting flickers in accordance with an embodiment of the invention.

FIG. 3 is a diagram of the procedure for correcting flickers in accordance with an embodiment of the invention. The incoming image data may be high-dynamic-range (HDR) pixel data of an image, and the incoming image data comprises short-exposed image data and long-exposed image data. In block 310, the incoming image data is unpacked, and the long-exposed image data and the short-exposed image data are forwarded to the long exposure path and the short exposure path, respectively. In block 320, the long exposed image data are obtained. In block 330, the controller 220 calculates a first vertical profile for the long exposed image data. For example, the first vertical profile for the long exposure path can be expressed as the following equation:

$$V_{LE,c}(i) = \sum_{j \in All\ columns} LE_c(i, j) \text{ for non clipped } LE_c(i, j) \text{ pixels}$$

where i and j denote the row index and column index of the incoming image, respectively; and c denotes one of the color components such as R, Gr, B or Gb.

In block 340, the short-exposed image data are obtained. In block 350, the controller 220 calculates a second vertical profile for the short exposure path. For example, the second vertical profile for the short exposure path can be expressed as the following equation:

$$V_{SE,c}(i) = \sum_{j \in All\ columns} SE_c(i, j) \text{ for non clipped } LE_c(i, j) \text{ pixels}$$

where i and j denote the row index and column index of the incoming image, respectively; and c denotes one of the color components such as R, Gr, B or Gb.

Specifically, the first vertical profile and the second vertical profile are indicative of the summation of the non-clipped pixels in the long exposure path and the short exposure path, respectively. After calculating the first vertical profile and the second vertical profile, the controller 220 further compares the first vertical profile and the second vertical profile. Since the first vertical profile for the long exposure path is flicker free, it will be appreciated that no modulation signal is contained in the first vertical profile, and the controller 220 then calculates the ratio between the first vertical profile and the second vertical profile (block 360). In block 370, the controller 220 further performs a smoothing process on the ratio between the first vertical profile and the second vertical profile. For example, a third-order Savitzky-Golay filter with a window size of 15 can be used in the smoothing function to increase the signal-to-noise ratio, but the invention is not limited thereto. Specifically, the controller 220 calculates the convolution between the calculated ratio and the Savitzky-Golay filter to obtain a smoothed modulation signal.

In the case when an entire row of the long exposure image is clipped due to over-exposure, there will be no data point for that row and the missing point can be interpolated from the neighboring rows. Many smoothing filters, such as Savitzky-Golay filter, can handle missing data points because they can use non-uniformly sampled data. Furthermore, flicker modulation is almost always a periodic function and therefore missing data points can be interpolated by taking advantage of the periodic nature of the flicker modulation. For example, a flicker due to fluorescent lights is a sinusoidal function of a known frequency, which can be characterized with a plurality of parameters, e.g. amplitude and phase. By fitting a sinusoidal function of a given frequency, the invention can still work when only a few rows can provide reliable data points. In general, missing data can be interpolated first and then the modulation function can be smoothed.

Furthermore, the controller 220 computes the ratio of exposure time between the long exposure path and the short exposure path, where the computed ratio is a portion of a flicker modulation function. For example, the flicker modulation function can be expressed as follows:

$$\text{inv\_Mod}_c(i) = \frac{V_{LE,c}(i)}{V_{SE,c}(i) \cdot \text{gain}}$$

wherein gain denotes the ratio of exposure time between the long exposure path and the short exposure path. Specifically, the flicker modulation function can be obtained by dividing the ratio between the first vertical profile and the second profile by the ratio of exposure time.

It should be noted that the flicker modulation function is used to compensate the flicker modulation signal applied to the short-exposed image data in the short exposure path. Accordingly, the controller 220 may multiply the flicker modulation function with the pixel values of short-exposed raw data in the short exposure path (i.e. convolution), and then obtain a flicker-corrected raw data for the short exposure path (block 380). As a result, a resulting composite image can be obtained by using (e.g. packing) the first image data in the long exposure path (i.e. the first image data is flicker free) and the flicker-corrected image data in the short exposure path (block 390). It should also be noted that the aforementioned flicker correction method is individually applied to each color channel (e.g. R, Gb, B, Gr) of the short-exposed image.

Figure 4:
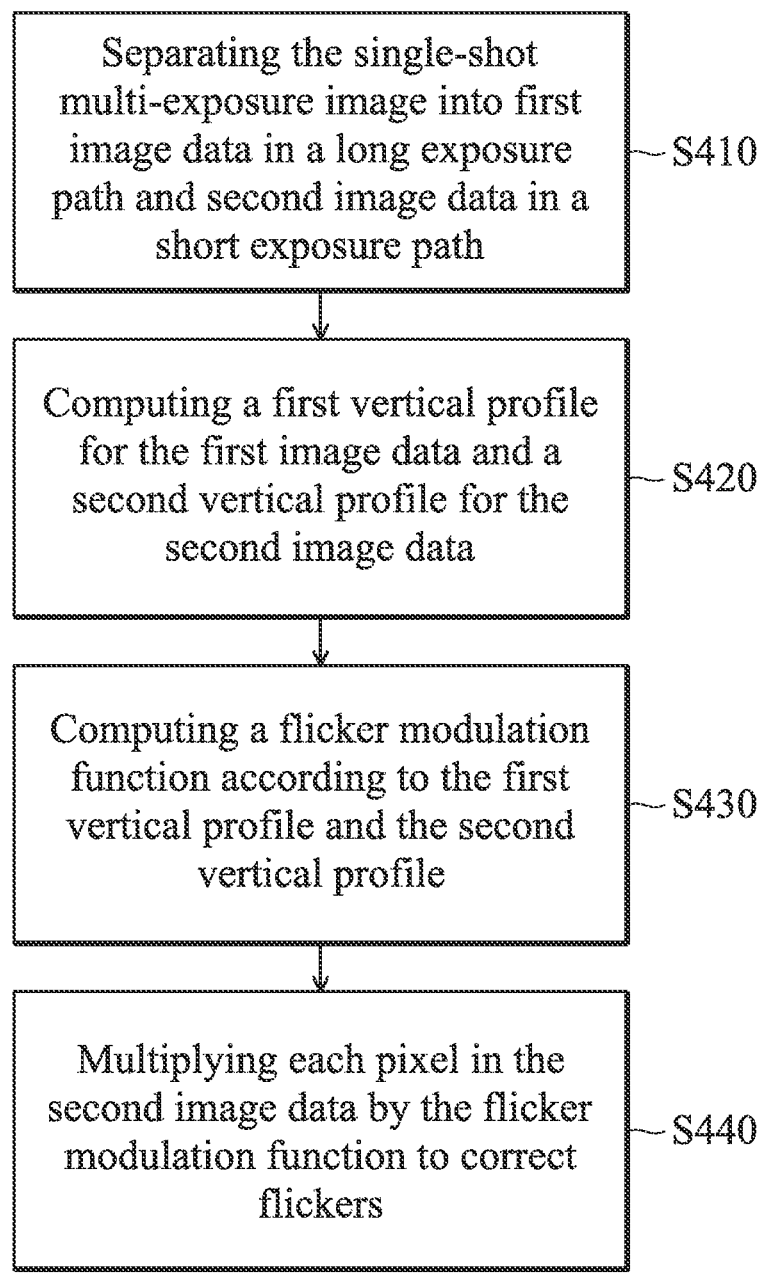
FIG. 4 is a diagram of the flicker correction method in accordance with an embodiment of the invention.

FIG. 4 is a diagram of a method for correcting flickers in a single-shot multi-exposure image in accordance with an embodiment of the invention. In step S410, the single-shot multiple-exposure image is separated (e.g. unpack) into first image data in a long exposure path and second image data in a short exposure path. In step S420, a first vertical profile for the first image data is computed, and a second vertical profile for the second image data is computed. As described in aforementioned embodiments, the first vertical profile and the second vertical profile are summation values of the non-clipped pixels of all rows of the first image data and the second image data, respectively.

In step S430, computing a ratio of exposure time according to the first vertical profile and the second vertical profile. It should be noted that the ratio of exposure time is a flicker modulation signal. In step S440, the ratio of exposure time is multiplied to each pixel in the second image data to correct flickers.

In view of the above, a method for correcting flickers in a single-shot multiple-exposure image and an image-capturing apparatus are provided. A flicker-corrected image data can be obtained using the first vertical profile for the long exposure path, the second vertical profile for the short exposure path, the ratio between the first vertical profile and the second vertical profile, and the ratio of exposure time between the long exposure path and the short exposure path.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for correcting flickers in a single-shot multiple-exposure image having first image data and second image data, the method comprising:
    computing a first vertical profile from a plurality of unclipped pixels of the first image data and a second vertical profile for the second image data from a plurality of pixels in the second image data that correspond to the unclipped pixels of the first image;
    computing a flicker modulation function according to the first vertical profile and the second vertical profile; and
    multiplying the second image data by the flicker modulation function to correct flickers.

2. The method as claimed in claim 1, further comprising:
    separating the single-shot multi-exposure image into the first image data in a long exposure path and the second image data in a short exposure path.

3. The method as claimed in claim 1, wherein each pixel in the second image data is multiplied by the flicker modulation function to correct flickers.

4. The method as claimed in claim 2, further comprising:
    computing a first ratio of exposure time between the long exposure path and the short exposure path.

5. The method as claimed in claim 4, further comprising:
    computing a second ratio between the first vertical profile and the second vertical profile;
    performing a smoothing process to the second ratio;
    computing the flicker modulation function by dividing the second ratio by the first ratio.

6. The method as claimed in claim 2, wherein when a specific row of the first image data in the long exposure path is clipped due to over-exposure, a smoothing filter interpolates a plurality of data points for the specific row with neighboring rows.

7. The method as claimed in claim 6, wherein the smoothing filter is a Savitzky-Golay filter.

8. The method as claimed in claim 1, further comprising:
    obtaining a resulting composite image using the first image data and the flicker-corrected second image data.

9. The method as claimed in claim 8, wherein the resulting composite image is obtained by packing the first image data and the flicker-corrected second image data.

10. An image-capturing apparatus, comprising:
    an image sensor, configured to capture a single-shot multiple-exposure image having first image data and second image data;
    a controller, configured to compute a first vertical profile from a plurality of unclipped pixels of the first image data and a second vertical profile for the second image data from a plurality of pixels in the second image data that correspond to the unclipped pixels of the first image, and computes a flicker modulation function according to the first vertical profile and the second vertical profile, wherein the controller further multiplies the flicker modulation function to the second image data to correct flickers.

11. The image-capturing apparatus as claimed in claim 10, wherein the controller separates the single-shot multi-exposure image into the first image data in a long exposure path and the second image data in a short exposure path.

12. The image-capturing apparatus as claimed in claim 10, wherein each pixel in the second image data is multiplied by the flicker modulation function to correct flickers.

13. The image-capturing apparatus as claimed in claim 11, wherein the controller further computes a first ratio of exposure time between the long exposure path and the short exposure path.

14. The image-capturing apparatus as claimed in claim 13, wherein the controller further computes a second ratio between the first vertical profile and the second vertical profile, performs a smoothing process to the second ratio, and computes the flicker modulation function by dividing the second ratio by the first ratio.

15. The image-capturing apparatus as claimed in claim 14, wherein when a specific row of the first image data in the long exposure path is clipped due to over-exposure, a smoothing filter is used to interpolate data points of the specific row with neighboring rows thereof in the smoothing process.

16. The image-capturing apparatus as claimed in claim 15, wherein the smoothing filter is a Savitzky-Golay filter.

17. The image-capturing apparatus as claimed in claim 10, wherein the controller further obtains a resulting composite image using the first image data and the flicker-corrected second image data.

18. The image-capturing apparatus as claimed in claim 17, wherein the resulting composite image is obtained by packing the first image data and the flicker-corrected second image data.

19. A controller, coupled to receiving a single-shot multiple-exposure image captured by an image sensor, configured to:
compute a first vertical profile from a plurality of unclipped pixels of a first image data and a second vertical profile for a second image data from a plurality of pixels in the second image data that correspond to the unclipped pixels of the first image;
compute a flicker modulation function according to the first vertical profile and the second vertical profile, and
multiply the flicker modulation function to the second image data to correct flickers,
wherein, the first image data and the second image data associate with the single-shot multiple exposure image.

* * * * *